US012800374B2

(12) United States Patent
Mamos et al.

(10) Patent No.: US 12,800,374 B2
(45) Date of Patent: Nov. 17, 2026

(54) SQUEEZE DOSER WITH CHILDPROOF CAP

(71) Applicant: Curaleaf, Inc., Wakefield, MA (US)

(72) Inventors: Katharine Mamos, Belmont, NH (US); Jessie Kater, Newburyport, MA (US); Cristopher Benitah, Bozeman, MT (US); Jason White, Los Angeles, CA (US); James McWhorter, Arlington, MA (US)

(73) Assignee: Curaleaf, Inc., Stamford, CT (US)

( * ) Notice: Subject to any disclaimer, the term of this patent is extended or adjusted under 35 U.S.C. 154(b) by 0 days.

(21) Appl. No.: 18/193,398

(22) Filed: Mar. 30, 2023

(65) Prior Publication Data

US 2023/0392966 A1 Dec. 7, 2023

Related U.S. Application Data

(63) Continuation of application No. 17/382,836, filed on Jul. 22, 2021, now Pat. No. 11,629,986.

(51) Int. Cl.
*G01F 11/00* (2006.01)
*G01F 11/28* (2006.01)

(52) U.S. Cl.
CPC .......... *G01F 11/006* (2013.01); *G01F 11/286* (2013.01)

(58) Field of Classification Search
CPC ............................ G01F 11/006; G01F 11/286
See application file for complete search history.

(56) References Cited

U.S. PATENT DOCUMENTS 2,237,791 A 4/1941 Santos
4,625,897 A 12/1986 Wortly
4,830,226 A * 5/1989 Kong .................. B67D 7/0216 222/207
4,936,490 A 6/1990 Battegazzore
4,971,226 A 11/1990 Donoghue
5,261,569 A 11/1993 Sandwell
5,263,616 A 11/1993 Abplanalp
5,263,787 A 11/1993 Wilcox et al.
5,366,119 A * 11/1994 Kline ................. B05B 11/0037 222/321.5
5,381,930 A 1/1995 Kalabakas
(Continued)

FOREIGN PATENT DOCUMENTS

EP 2106535 2/2011
EP 2512947 4/2015
(Continued)

*Primary Examiner* — Frederick C Nicolas
(74) *Attorney, Agent, or Firm* — Fish & Richardson P.C.

(57) ABSTRACT

A squeeze doser with a childproof cap is described herein. The squeeze doser with a childproof cap includes a container, a reservoir, and a cap. The container includes a neck. A reservoir is coupled with the neck of the container, wherein the reservoir further includes a spout and at least one notch located on an outer surface of the neck, said spout coupled with a fill tube that guides liquid stored in the container to the spout, the spout including one or more holes positioned to maintain a predetermined dosage of liquid within the reservoir. The cap is releaseably attached to the neck and includes at least one protrusion that is configured to mate with the at least one notch of the neck, whereby the at least one protrusion coupled with the at least one notch renders the container childproof.

11 Claims, 6 Drawing Sheets

(56) References Cited

U.S. PATENT DOCUMENTS

| | | | | |
|---|---|---|---|---|
| 5,791,505 | A | 8/1998 | Gilliand | |
| 5,799,838 | A | 9/1998 | Miller | |
| 5,833,124 | A * | 11/1998 | Groves | G01F 11/286 222/211 |
| 6,186,367 | B1 | 2/2001 | Harrold | |
| 6,253,967 | B1 | 7/2001 | Sperna Welland | |
| 6,330,960 | B1 | 12/2001 | Faughey et al. | |
| 6,705,492 | B2 * | 3/2004 | Lowry | A47K 5/122 222/215 |
| 6,758,620 | B1 | 7/2004 | Harrold | |
| 6,913,158 | B1 | 7/2005 | Bosl et al. | |
| 7,004,354 | B2 * | 2/2006 | Harper | B65D 75/58 222/212 |
| 7,097,071 | B2 | 8/2006 | Anderson et al. | |
| 7,549,816 | B2 | 6/2009 | Glynn et al. | |
| 7,810,663 | B2 | 10/2010 | Young | |
| 7,850,050 | B2 | 12/2010 | Brown | |
| 8,057,733 | B2 | 11/2011 | Begley et al. | |
| 8,434,647 | B2 | 5/2013 | Aamar | |
| 8,499,968 | B2 | 8/2013 | Aviram | |
| 8,528,795 | B2 | 9/2013 | Law et al. | |
| 8,563,013 | B2 | 10/2013 | Meehan et al. | |
| 8,672,154 | B2 | 3/2014 | Seelhofer | |
| 8,794,488 | B2 | 8/2014 | van der Molen | |
| 8,985,390 | B2 | 3/2015 | Altonen et al. | |
| 9,004,292 | B2 | 4/2015 | Carter et al. | |
| 9,120,112 | B2 | 9/2015 | Wegener et al. | |
| 9,387,965 | B2 | 7/2016 | Skillin et al. | |
| 9,958,307 | B1 | 5/2018 | Anderson et al. | |
| 10,234,318 | B2 | 3/2019 | Pater et al. | |
| 10,239,671 | B2 | 3/2019 | Schoubben et al. | |
| 10,365,140 | B2 | 7/2019 | Koster et al. | |
| 10,471,452 | B2 | 11/2019 | Skillin et al. | |
| 10,488,241 | B2 | 11/2019 | Hoefte | |
| 10,488,242 | B1 | 11/2019 | Scotten et al. | |
| 10,689,163 | B2 | 6/2020 | Ezzina | |
| 10,948,327 | B2 | 3/2021 | French et al. | |
| 11,629,986 | B2 | 4/2023 | Mamos et al. | |
| 2001/0032864 | A1 * | 10/2001 | Shepherd | B05B 11/0037 222/321.5 |
| 2006/0213912 | A1 | 9/2006 | Zaytoun | |
| 2009/0294468 | A1 * | 12/2009 | Tom | B05B 15/30 222/321.5 |
| 2011/0240678 | A1 * | 10/2011 | Keller | B05B 11/0037 222/321.5 |
| 2017/0254689 | A1 | 9/2017 | Pavis | |
| 2017/0276531 | A1 | 9/2017 | Jaeckel et al. | |
| 2019/0367217 | A1 | 12/2019 | Sitwell et al. | |
| 2023/0026087 | A1 | 1/2023 | Mamos et al. | |

FOREIGN PATENT DOCUMENTS

| | | |
|---|---|---|
| EP | 2558371 | 11/2015 |
| EP | 2444782 | 1/2019 |

* cited by examiner

300

400

500

600

SQUEEZE DOSER WITH CHILDPROOF CAP

CROSS-REFERENCE TO RELATED APPLICATIONS

This application is a continuation of and claims priority to U.S. patent application Ser. No. 17/382,836, filed on Jul. 22, 2021, the entire contents of which are incorporated by reference herein.

TECHNICAL FIELD

This description relates to a dispenser for liquids. In particular, this description relates to a precise liquid dispenser with a reservoir and childproof cap.

BACKGROUND

Containers are often used to dispense a measured dose of liquid. The containers are typically designed for manipulation using both hands. Moreover, the measured dose of liquid is typically relatively large, as is the case for pharmaceutical ingredients, mouthwash, and other liquids. The childproofing features are often formed between a neck of the container and the cap, thereby limiting the design of the container and cap.

SUMMARY

Provided herein is a squeeze doser with a childproof cap. The squeeze doser with a childproof cap includes a container, a reservoir, and a cap. The container includes a neck. A reservoir is coupled with the neck of the container, wherein the reservoir further comprises a spout and at least one notch located on an outer surface of the neck, said spout coupled with a fill tube that guides liquid stored in the container to the spout, the spout including one or more holes positioned to maintain a predetermined dosage of liquid within the reservoir. The cap is releaseably attached to the neck and includes at least one protrusion that is configured to mate with the at least one notch of the neck, whereby the at least one protrusion coupled with the at least one notch renders the container childproof.

In some examples, the container is childproof when the strength of the average adult human hand is required to release the cap from the reservoir. The predetermined dosage of liquid may be 1 milliliter (mL). In some examples, the spout includes an additional hole to equalize pressure between the internal cavity of the container and an atmospheric pressure. The cap may include at least one spline to resist deformation. The cap, reservoir, and container may be formed from high density polyethylene (HDPE) or from polyethylene terephthalate (PET). In embodiments, the cap, reservoir, and container are formed from a semirigid polymer. In embodiments, at least one of the cap, reservoir or container is transparent. At least one of the container is ergonomically configured to fit within a single adult human hand.

The details of one or more embodiments of the invention are set forth in the accompanying drawings and descriptions below. Other features, objects and advantages of the invention will be apparent from the description and drawings, and from the claims.

DESCRIPTION OF DRAWINGS

Like reference symbols in the various drawings indicate like elements.

DETAILED DESCRIPTION

The container described herein enables a squeeze doser for dispensing liquids. Generally, the doser is a container that is flexible in that it can be deformed. Pressure is applied to exterior walls of the container, which causes liquid inside the container to travel into a fill tube. In particular, liquid at the base of the container enters an open end of the fill tube and travels to a spout of a reservoir, and is released in the reservoir. When the pressure applied to the exterior walls of the container is released, the liquid in the reservoir drains back into the container through the spout, leaving a measured dose of liquid in the reservoir. In examples, the liquid is any liquid that is dispensed via a fill tube. The liquid may contain pharmaceutically active ingredients. The liquid may also be a controlled substance. In an embodiment, the liquid is a substance that is appropriate in small doses. For example, the small dose may be approximately 1 mL.

In an embodiment, the container is a small container, and pressure can be applied to the exterior walls of the small container using the fingers on a single average adult human hand. For example, the small container can be held in the palm of the hand with the thumb and point finger of the same hand applying pressure to the small container. In an embodiment, the container is semi-rigid to govern the amount of deformation available when pressure is applied to exterior walls of the container. For example, the amount of deformation due to pressure applied to the container may be limited by the semirigidity of the container in view of the average amount of pressure able to be applied to the container by a single adult human hand.

Figure 1:
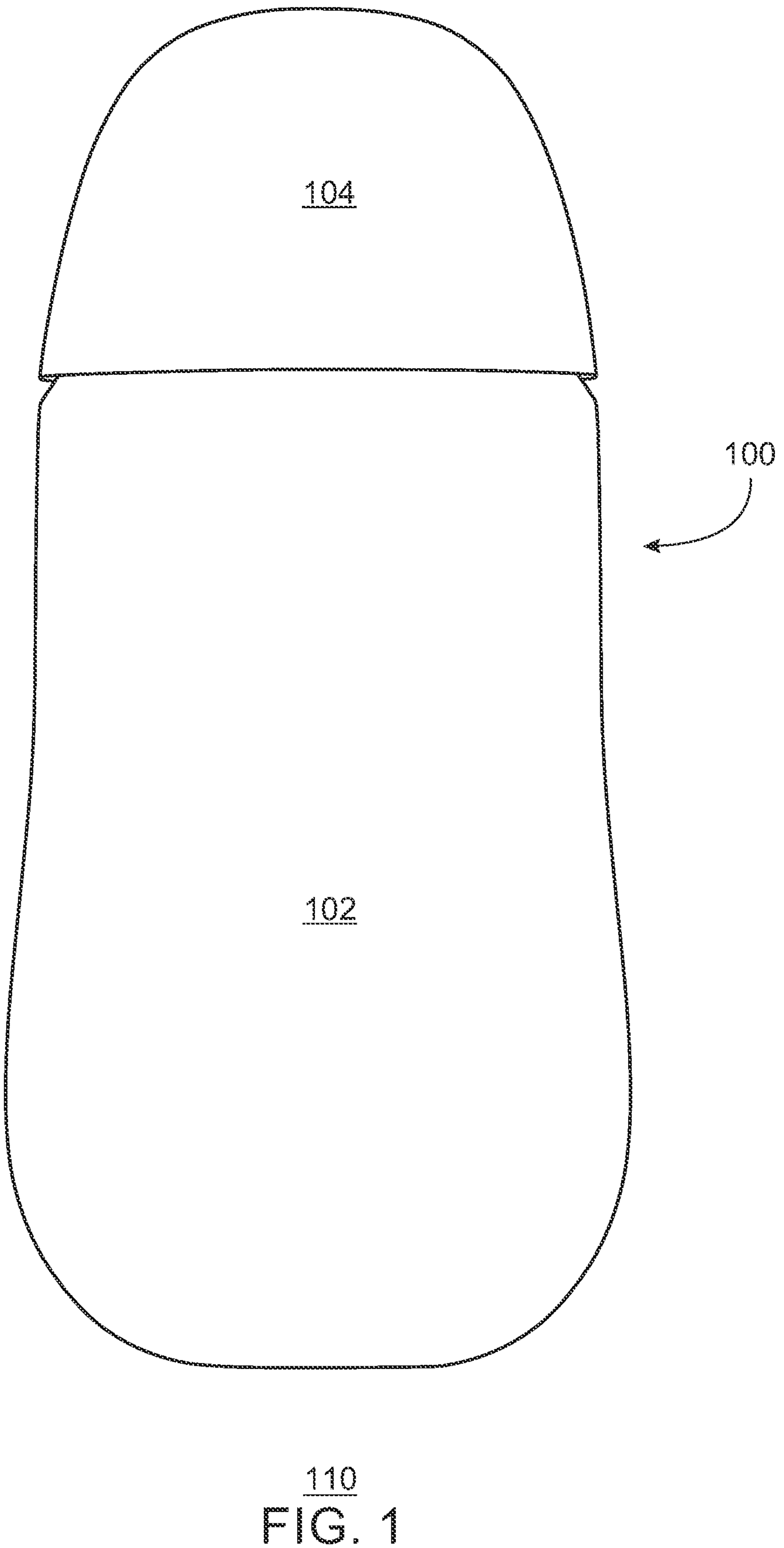
FIG. 1 is a front view of a squeeze doser with a childproof cap.

FIG. 1 is a front view 110 of a squeeze doser with a childproof cap 100 (generally referred to as the doser 100). As illustrated, the doser 100 includes a container 102 and a childproof cap 104. The container 102 stores liquids in an interior cavity created by the exterior walls, top surface (not illustrated), neck (not illustrated), and bottom surface of the container 102. Generally, when the container 102 is deformed, the contents in the interior cavity are forced into a fill tube (not illustrated) coupled with a reservoir. The reservoir is encased within a neck of the container 102. In an embodiment, deforming the container 102 includes applying pressure to the exterior walls of the container 102 such that the contents of the container 102 are forced into the fill tube and reservoir. When pressure is released from the container 102, the liquid in the reservoir drains back into the container 102 leaving a predetermined dosage of liquid in the reservoir.

In an embodiment, the doser 100 is ergonomically shaped to conform to a human hand. For example, the doser 100 is shaped such that an adult human hand can squeeze (e.g., apply pressure) to the container 102 using a single hand. In some examples, the container 102 is semirigid, semi-firm, deformable, and proportioned to enable gripping and compressing by a single adult human hand. In the example of FIG. 1, the container 102 has a bulbous lower portion. The container 102 may have a bulbous lower portion that is sized to fit or rest in the palm of a human hand. In an embodiment, a user grips or supports the container 102 in the palm of the user's hand, between the thumb and pointer finger.

The present techniques enable the dispensing of a relatively small amount of liquid from the container 102. Traditionally, containers for dispensing liquids are designed to dispense a relatively large quantity of liquid. By contrast, the present techniques enable the dispensing of liquids in relatively small amounts, such as a couple of milliliters. In an embodiment, the semirigidity of the container 102 reduces the amount of deformation available at the container 102, which limits the amount of liquid dispensed. In an example, the doser 100 according to the present techniques dispenses 1 mL of liquid.

In embodiments, the container 102 and cap 104 are made from a plastic or otherwise deformable material. For example, the container 102 and the cap 104 are made from HDPE. In some examples, the container 102 and the cap 104 are made from PET. In some embodiments, the container 102 and cap 104 are made from a polymer that is semirigid. The material used to form the doser 100 is a strong, slightly flexible material that deforms enough to displace approximately 1 mL of liquid in response to pressure from an average human adult hand.

Figure 2:
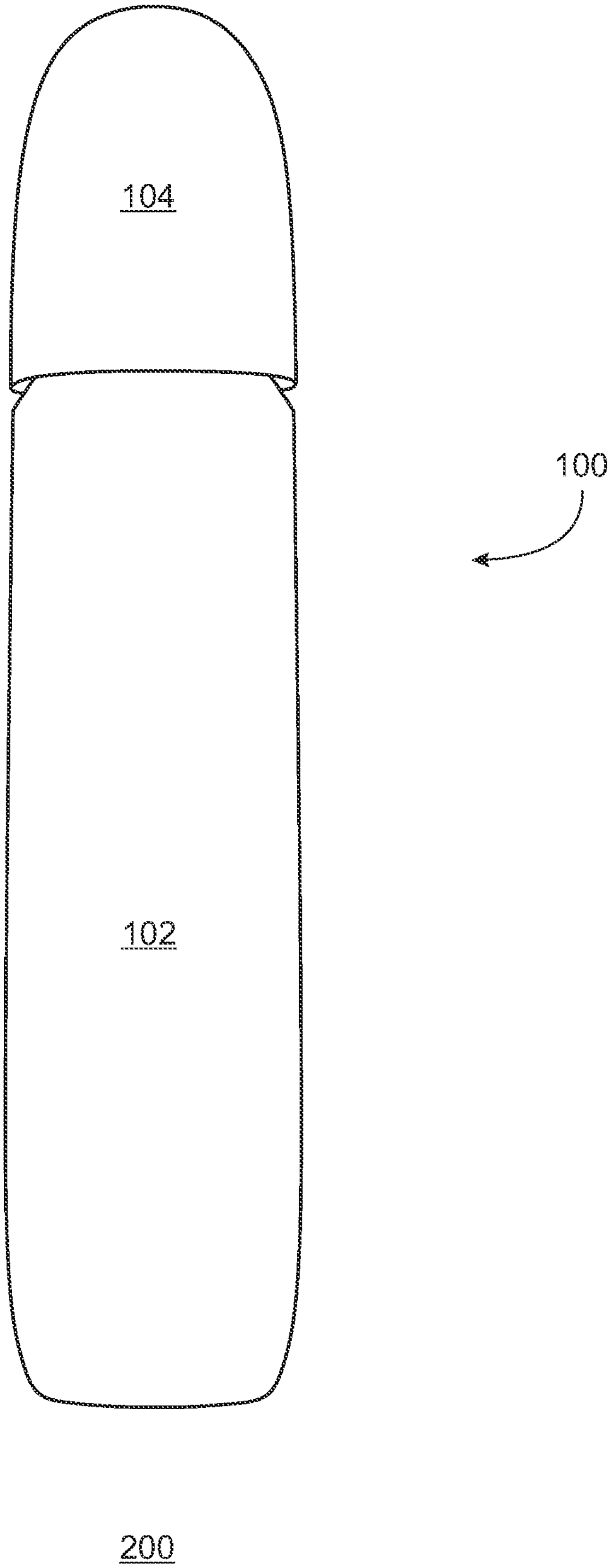
FIG. 2 is a side view of a squeeze doser with a childproof cap.

FIG. 2 is a side view 200 of a squeeze doser with a childproof cap 100. As illustrated, the doser 100 includes a container 102 and a 104. Generally, the container 102 is formed from a semirigid polymer, and the user can apply pressure to the container 102 exterior walls without fear of over dispensing the liquid within the container 102. As described above, the material is a semirigid deformable material that can withstand the compression by a single human hand without collapsing.

The present techniques enable a squeeze dispensing container that holds relatively small quantities of liquid with a shape that prevents slippage of the container from the hand, and an ergonomic shape that enables control of the container using a single hand. By using an ergonomically shaped container 102, the present techniques enable precise control over a small amount of liquid. Traditionally, squeeze dispensers are large so that both human hands are used to apply pressure to the squeeze dispenser. In an embodiment, the amount of strength needed to release (e.g., unscrew, uncouple) the reservoir from the container is an amount of strength greater than that typically generated by a child, creating a childproof container. In an embodiment, the container can be refilled with liquid by releasing the reservoir from a neck of the container, filling the container through the opening in the neck, and then re-attaching the reservoir to the container via an opening in the neck of the container.

Figure 3:
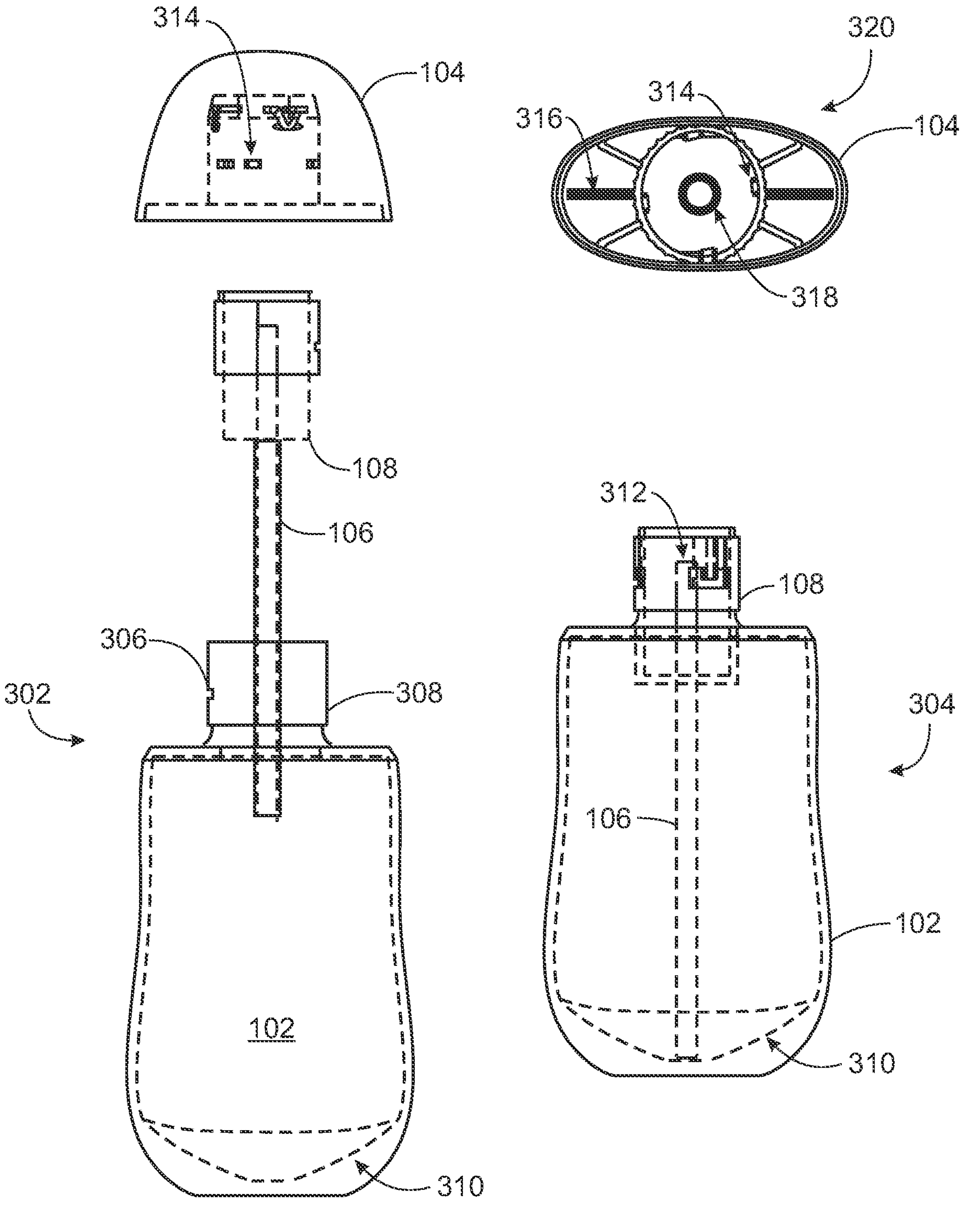
FIG. 3 is an exploded front view and a coupled front view of the squeeze doser with a childproof cap.

FIG. 3 is an exploded front view 302 and a coupled front view 304 of the squeeze doser with a childproof cap. In the exploded front view 302, the container 102 and the 104 are illustrated. As illustrated, the container 102 includes a neck 308. The neck is formed with one or more notches 306. A fill tube 106 is illustrated as coupled with a reservoir 108. As illustrated, the container 102 has an interior cavity 310. The interior cavity of the container 102 is shaped such that the bottom of the interior cavity 310 comes to a sloped point where liquid naturally accumulates when the container 102 is upright. The sloped point at the bottom of the interior cavity 310 is sized such that it is slightly wider than the diameter of the fill tube 106. For example, in the coupled front view 304 of FIG. 3, the container 102 coupled with the fill tube 106 and reservoir 108 is illustrated. As liquid is dispensed from the container 102, the end of the fill tube 106 is positioned at the bottom of the interior cavity 310 where the sloped bottom portion of the interior cavity 310 converges upon a single area slightly wider than the fill tube 106. In this manner, the contents of the container 102 are able to be completely dispensed from the container.

Figure 5:
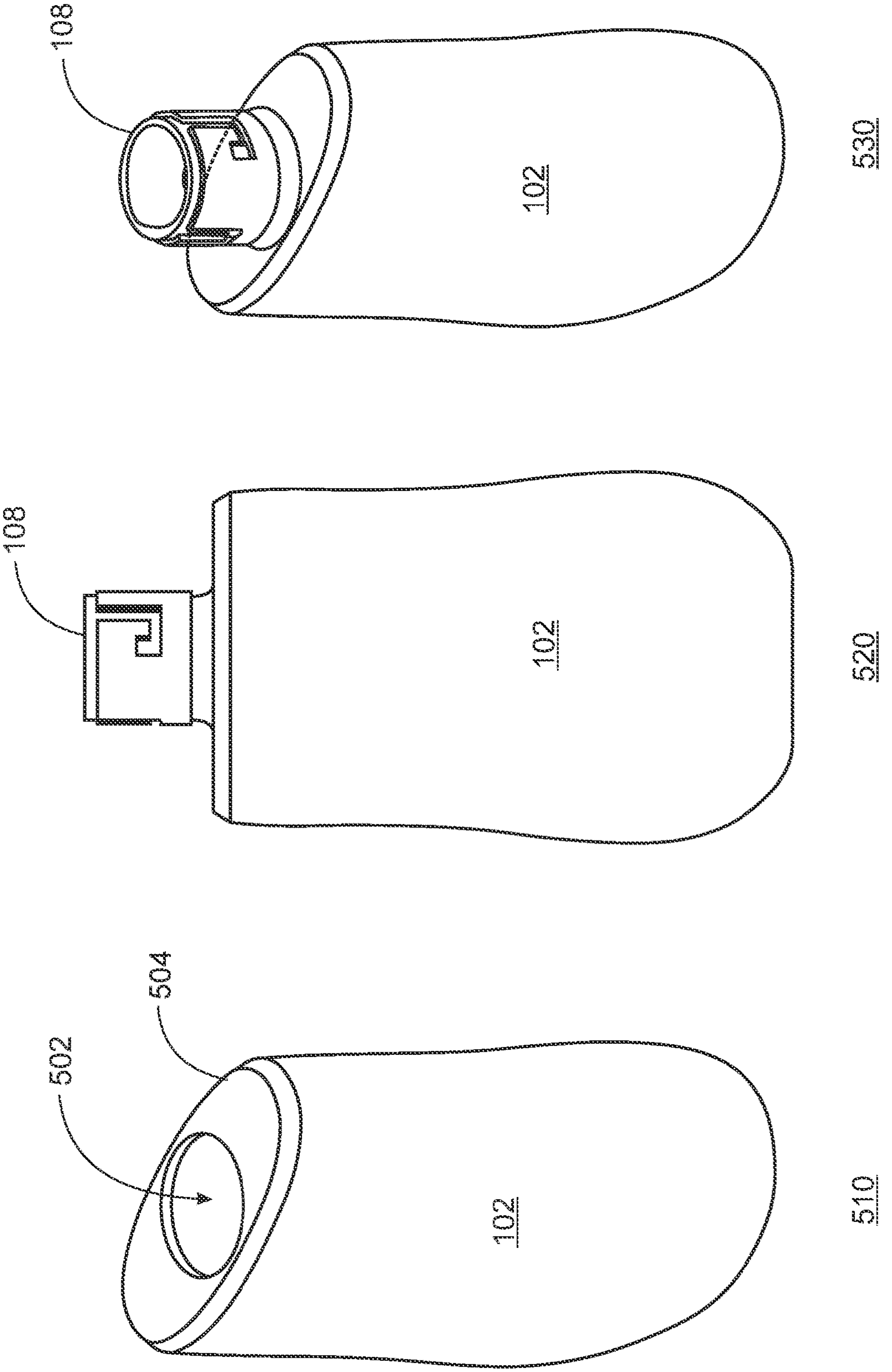
FIG. 5 is a perspective view of the container, a front view of the container coupled with the reservoir, and a perspective view of the container coupled with the reservoir.

In embodiments, during manufacture the container 102 may be injection molded with a neck 308 extending from the top surface of the container, wherein the top surface is flat (e.g., FIG. 5). Thus, in embodiments the container 102 includes a neck 308. The container 102 may be filled with liquid through the neck 308, and then coupled with the fill tube 106 and the reservoir 108. In the example of FIG. 3, the neck 308 includes one or more notches 306. In embodiments, the notches 306 engage corresponding protrusions within the cap 104. The protrusions enable a child proof connection between container 102, cap 104, and reservoir 108. A bottom view 320 of the cap 104 is illustrated in FIG. 3. Generally, the cap 104 is designed to be releasably coupled with the container 102. In embodiments, the cap is releasably coupled with the container 102 via the neck 308. The cap 104 includes one or more protrusions 314 that are designed to travel along the one or more notches 306 of the neck 308. To release the cap 104 from the neck 308, pressure and a twisting motion are applied to glide the protrusions 314 along the notches of the neck 308. The need for higher than normal pressure to release the cap 104 from the neck 308 makes the doser child resistant. In an embodiment, the child proofing is pressure-based child proofing, where an amount of pressure greater than that typically generated by a child must be used to release the cap from the reservoir. As illustrated in the bottom view 320 of the cap 104, one or more splines 316 are present within the cap 104. The splines 316 prevent deformation of the cap 104 when pressure and twisting are applied to guide the protrusions 314 along the notches 306 of the neck 308. Additionally, in embodiments the cap 104 includes a center retainer 318. In some examples, the center retainer 318 may be releasably coupled with a spout 312 of the reservoir 108. In embodiments, during manufacture the container 102 may be injection molded with an opening in the top surface of the container, wherein the top surface is flat and does not include a neck (e.g., FIG. 5). The container 102 may be filled with liquid and then receive the neck 308, fill tube 106 and the reservoir 108.

In examples, pressure is applied to the container 102 forcing liquid into the fill tube 106 and into the reservoir 108 through the spout 312. The spout is used to control the flow of liquid in and out of the reservoir 108. For example, the level of liquid maintained in the reservoir may be above a predetermined dosage (e.g., 1 mL) while pressure is applied to the container 102. In embodiments, the predetermined dosage is a volume of liquid that rises to a level within the reservoir controlled by the position of holes along the spout. Within the reservoir 108, the spout 312 disperses liquid forced into the reservoir from the fill tube 106. When pressure is released from the container 102, the liquid in excess of the predetermined dosage drains from the reservoir 108 through the spout 312, down the fill tube 106, and back in to the container 102. In this manner, accurate and precise dosing is enabled.

In embodiments, the container 102, cap 104, fill tube 106, reservoir 108, and neck 308 are made from a plastic or otherwise deformable material. For example, the container 102, cap 104, fill tube 106, reservoir 108, and neck 308 are made from HDPE. In some examples, the container 102, cap 104, fill tube 106, reservoir 108, and neck 308 are made from PET. In some embodiments, the container 102, cap 104, fill tube 106, reservoir 108, and neck 308 are made from a polymer that is semirigid. Additionally, the container 102, cap 104, fill tube 106, reservoir 108, and neck 308 can be made from any combinations of plastic or otherwise deformable material.

Figure 4:
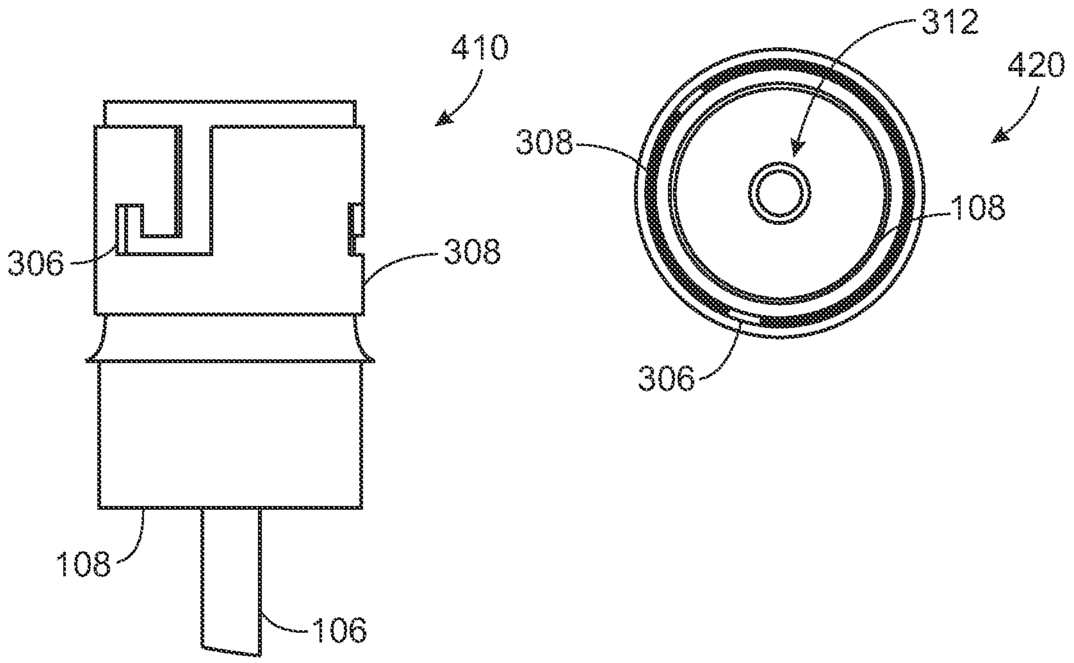
FIG. 4 is a side view and a top view of a reservoir coupled with a fill tube.

FIG. 4 is a side view 410 and a top view 420 of a neck 308 coupled with a fill tube 106. In the example of FIG. 4, the top view 410 shows the fill tube 106, bottom portion of the reservoir 108, neck 308, and notches 306. The fill tube 106 is illustrated coupled with the reservoir 108. The notches 306 enable pressure-based child proofing. For example, protrusions 314 (FIG. 3) follow the path created by the notches 306. When the doser 100 is completely closed, a protrusion of the cap is seated at the very end or hooked portion of a corresponding notch 306. To open the doser 100, pressure is applied to the cap 104 (not illustrated) to force the protrusions 314 down the leftmost side of the notches 306. A subsequent twisting motion guides the protrusions 314 (not illustrated) across the exterior of the neck 308 to the rightmost side of the notches 306. Once the protrusions 314 are positioned at the rightmost, bottom portion of the notches 306, the protrusions 314 are guided upwards along the notches. When guiding the protrusions as described, the cap 104 is removed from the neck 308 as the protrusions 314 are released from a path created by the notches 306.

In the example of FIG. 4, the top view 420 of the reservoir 108 and neck 308 is illustrated with the spout 312 at the center of the reservoir 108. Notches 306 are illustrated along the external surface of the neck 308. For ease of description, the reservoir 108 is illustrated as a substantially circular. However, the reservoir 108 can be of any shape.

FIG. 5 is a perspective view 510 of the container 102, a front view 520 of the container 102 coupled with the reservoir 108, and a perspective view 530 of the container 102 coupled with the reservoir 108. In the perspective view 510, the container 102 is illustrated with an opening 502 in a top surface 504 of the container 102. In embodiments, the container 102 is made without a neck that enables access to the interior cavity. In this example, the opening 502 is configured to be permanently coupled with the reservoir 108. In some examples, the opening 502 enables the container 102 to be quickly filled with the desired liquid. In some examples, the reservoir 108 is permanently coupled with the container 102 after the interior cavity has been filled with the liquid. In some examples, the neck 308 is permanently coupled with the container 102 after the interior cavity has been filled with the liquid. Accordingly, the front view 520 is an illustration of the neck 308 permanently coupled with the container 102.

The view 530 is a perspective view of the container 102 with the neck 308. In an embodiment, the container 102 is permanently coupled with the neck 308. In an embodiment, the container 102 and neck 308 are a single form factor, simultaneously molded or formed together. In an embodiment, the container 102 is configured for filling before attachment of the reservoir. The container 102 is filled through an opening 502 in an exterior surface of the container 102 or through the neck 108. The access to the internal cavity of the container 102 enables the container 102 to be filled or refilled. In an example, the reservoir 108 may be forcibly inserted into the neck 308 of the container 102. In embodiments, the contact between the container 102, neck 308, and reservoir 108 is an interference fit, press fit, or friction fit. In this manner, a permanent bond between the container 102, neck 308, and the reservoir 108 is created. In an example, a permanent bond between the container 102, neck 308 and the reservoir 108 is bond that is not easily separated by the average human hand. In embodiments, the reservoir is removable. For example, the reservoir is removed from the container 102 or neck 308 to provide access to the internal cavity of the container 102 for filling or refilling.

Figure 6:
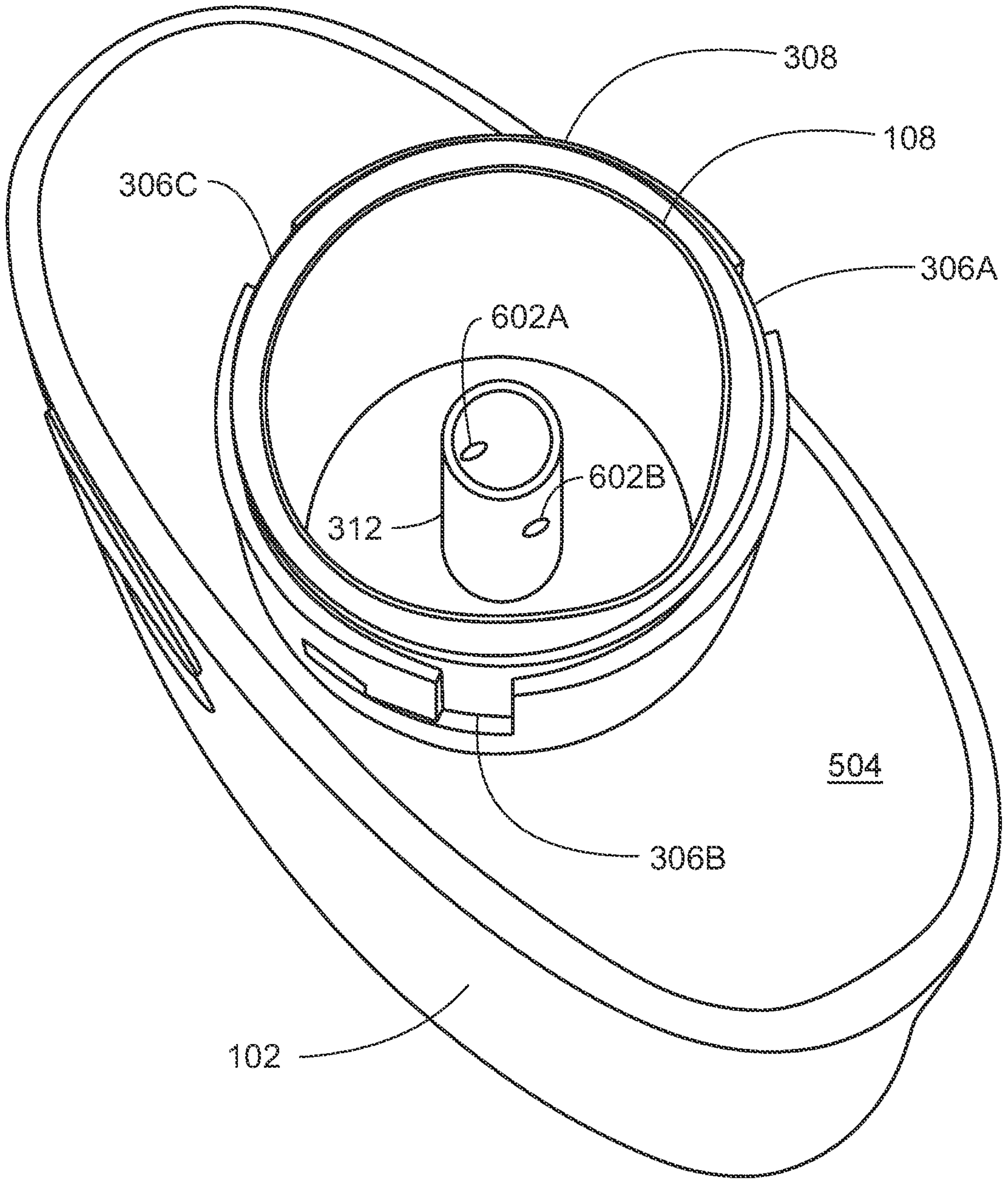
FIG. 6 is a perspective view of the reservoir coupled with the container.

FIG. 6 is a perspective view 600 of the reservoir 108 coupled with neck 308 and the container 102. As illustrated, the neck 308 includes three notches 306A, 306B, and 306C. As generally described above, the notches 306 create respective paths that each receive a respective protrusion (e.g., protrusions 314 of FIG. 3) of the cap 104. As illustrated, the reservoir includes a spout 312. The spout is coupled with a fill tube 106 (e.g., fill tube 106 of FIG. 2). As illustrated, the spout 312 includes a hole 602A and a hole 602B. When pressure is applied to the container 102, liquid enters the fill tube and travels from the fill tube to the spout 312. The liquid enters the reservoir 108 through the hole 602A and the hole 602B. In an embodiment, the hole 602A and hole 602B are positioned along the spout 312 such that when liquid is in the reservoir 108, releasing pressure from the body causes the liquid to drain out of the spout 312. After draining, the remaining liquid is substantially at or near the bottom level of the holes 602A and 602B. In an embodiment, the holes are positioned such that the remaining liquid is a 1 mL volume of liquid.

In an embodiment, third hole, drain, or pathway is provided within the reservoir 108. For example, the doser 100 can be filled with a liquid that is suited for dispensing in 1 mL dosages. Consider a user that stores the doser 100 on their person and experiences a change in atmospheric pressure. The change in atmospheric pressure may occur, for example, when swimming, traveling on an airplane, or traveling over land with an elevation change. As a user engages in activities that expose the doser 100 to varying atmospheric pressures, pressure within the doser 100 can increase and cause liquid to be inadvertently forced through the fill tube 106 and spout 312, into the reservoir 108. Differential pressures between the atmosphere and the interior cavity of the doser 100 are undesirable. The third hole, drain, or pathway enables pressures external to the doser 100 (e.g., atmospheric pressures) to be equalized with pressures within the doser 100 (e.g., pressures at the interior cavity. The equalization of pressures prevents unwanted dispensing of liquid from the doser 100.

The block diagrams of FIGS. 1-6 are not intended to indicate that the doser 100 is limited to the components illustrated in FIGS. 1-6. Rather, the doser 100 can include fewer or additional components and configurations (e.g., openings, fill tubes, reservoirs, childproofing features, etc.). The doser 100 may include any number of additional components not shown, depending on the details of the specific implementation.

The present invention enables accurate and precise dosing with a childproof cap. In embodiments, the container, cap, and reservoir are smaller than traditional squeeze dispensers. In an embodiment, the doser is approximately ten centimeters in height, four and a half centimeters wide at its widest point, at about two centimeters deep. In embodiments, the components described herein are constructed using polymeric materials. For example, polymers include, but are not limited to polyethylene, polypropylene, polyethylene terephthalate and the like. In embodiments, the polymers are formulated to be semirigid and harder than polymers used in traditional squeeze dispensers. The present invention can be used to dispense any liquids, including solutions, dispersions and suspensions.

A number of embodiments of the invention have been described. Nevertheless, it will be understood that various modifications may be made without departing from the spirit and scope of the invention.

What is claimed is:

1. A doser, comprising:

a container having a neck, the container having an ergonomic shape and is configured to be filled with a liquid though the neck, wherein the neck enables access to an internal cavity of the container, the internal cavity having a sloped bottom portion that converges on a single area; and a reservoir encased entirety within the neck of the container comprising a spout that is coupled with a fill tube, wherein the fill tube is configured to receive the liquid stored in the container from the sloped bottom portion of the internal cavity responsive to pressure applied to the container, wherein a predetermined dose of the liquid flows from the fill tube, through the spout, and into the reservoir according to a position of at least one hole along the spout.

2. The doser of claim 1, wherein when the pressure is released from the container, the liquid in the reservoir drains back into the container leaving the predetermined dose of liquid in the reservoir.

3. The doser of claim 1, wherein the predetermined dose of liquid is 1 milliliter.

4. The doser of claim 1, wherein the neck comprises notches that enable pressure based childproofing.

5. The doser of claim 1, wherein a cap releasably coupled to the neck comprises at least one protrusion that is configured to mate with at least one notch of the neck, whereby the at least one protrusion coupled with the at least one notch renders the container childproof when the at least one protrusion is seated at an end of the at least one notch and the doser is closed with a widest portion of the cap coplanar with a width of the container in a front view.

6. The doser of claim 1, wherein the reservoir and container are formed from high density polyethylene.

7. The doser of claim 1, wherein the reservoir and container are formed from polyethylene terephthalate.

8. The doser of claim 1, wherein the reservoir and container are formed from a semirigid polymer.

9. The doser of claim 1, wherein at least one of the reservoir or container is transparent.

10. The doser of claim 1, wherein the single area is slightly wider than the fill tube.

11. The doser of claim 1, wherein the container is shaped with a lower portion that is bulbous in at least one view, wherein a width of the lower portion in a front view is greater than the width of the lower portion in a side view.

* * * * *